US006891842B2

(12) United States Patent
Sahaya et al.

(10) Patent No.: US 6,891,842 B2
(45) Date of Patent: May 10, 2005

(54) SYSTEM AND METHOD FOR ENABLING MOBILE EDGE SERVICES

(75) Inventors: Anurag Sahaya, San Francisco, CA (US); Gupta Sukirti, Cupertino, CA (US); Jarmo Hillo, Campbell, CA (US); Petri Hallikainen, Cupertino, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/251,660

(22) Filed: Sep. 19, 2002

(65) Prior Publication Data

US 2003/0058874 A1 Mar. 27, 2003

Related U.S. Application Data

(60) Provisional application No. 60/324,796, filed on Sep. 21, 2001.

(51) Int. Cl.$^7$ ................................................. H04L 12/28
(52) U.S. Cl. ........................ 370/401; 370/349; 370/469
(58) Field of Search ............................... 370/465–467, 370/338, 352–356, 328, 401

(56) References Cited

U.S. PATENT DOCUMENTS

| | | | |
|---|---|---|---|
| 6,275,575 B1 | 8/2001 | Wu ........................ | 379/202.01 |
| 6,415,151 B1 * | 7/2002 | Kreppel ........................ | 455/445 |
| 6,515,989 B1 * | 2/2003 | Ronneke ....................... | 370/389 |
| 6,600,732 B1 * | 7/2003 | Sevanto et al. ............. | 370/349 |
| 6,608,832 B2 * | 8/2003 | Forslow ....................... | 370/353 |
| 6,621,793 B2 * | 9/2003 | Widegren et al. ......... | 370/230.1 |
| 6,636,491 B1 * | 10/2003 | Kari et al. ................... | 370/328 |

FOREIGN PATENT DOCUMENTS

| WO | WO99/37103 | 7/1999 |
|---|---|---|
| WO | WO00/08803 A1 | 2/2000 |

* cited by examiner

*Primary Examiner*—Ajit Patel
*Assistant Examiner*—Steven A Blount
(74) *Attorney, Agent, or Firm*—Darby & Darby, P.C.; Jamie L. Wiegand

(57) ABSTRACT

A system and method are directed to providing a Mobile Edge Service (MES) in a mobile network. An apparatus configured to enable a smart Gateway General Packet Radio Service (GPRS) Support Node (GGSN) to communicate with an MES application layer such that a service provider may provide a content delivery service, a network service, and an application service to an subscriber. The apparatus is also directed to enabling an interaction between components in the smart GGSN by providing a protocol stack that includes control, data, and management interface.

24 Claims, 7 Drawing Sheets

SYSTEM AND METHOD FOR ENABLING MOBILE EDGE SERVICES

CROSS REFERENCE TO RELATED APPLICATIONS

This application claims the benefit of U.S. Provisional Application No. 60/324,796, filed Sep. 21, 2001, the benefit of the earlier filing date of which is hereby claimed under 35 U.S.C. § 119 (e).

FIELD OF THE INVENTION

The present invention relates to wireless networks, and more particularly to providing an architecture for enabling mobile edge services (MES) in a mobile network.

BACKGROUND OF THE INVENTION

A mobile edge is a point where an interface between a mobile network connects to the Internet. At this mobile edge, various access technologies such as DSL, cable, and wireless connections join with the high-speed routed and optical core technologies of the Internet. It is at this strategic network position where a service provider has access to information about a subscriber and may provide value-added services before passing off the traffic to the Internet. A service provider can maximize a subscriber's experience with value added services. For example, service providers can increase their value to a subscriber by providing access to content portals, content delivery services, networking services, application services, and the like.

However, many of these value-added services can be scattered across various networking components, and infrastructures. Because these services can be scattered, the service provider often must manage multiple and disparate systems. As such, many applications managed by the service provider may not have access to information that may be required to provide a value-added service to the subscriber. Moreover, such information may be retrieved by the service provider in an ad-hoc approach resulting in an undue load on the service provider's resources. Thus, it is with respect to these considerations and others that the present invention has been made.

SUMMARY OF THE INVENTION

The present invention is directed to addressing the above-mentioned shortcomings, disadvantages and problems, and will be understood by reading and studying the following specification.

The present invention provides a system and method directed to enabling a Mobile Edge Service (MES) in a mobile network. The invention is directed to enable a smart Gateway General Packet Radio Service (GPRS) Support Node (GGSN) to communicate with an MES layer such that a service provider may provide content delivery services, network services, and application services to an subscriber.

According to one aspect of the invention, an apparatus is directed toward enabling a mobile edge service. The apparatus includes a smart GGSN interface, a switch, and a core service layer. The smart GGSN interface is configured to receive a packet from at least one of a wireless application, and a Wireless Network Includes (WNI). The switch is configured to receive the packet from the smart GGSN interface, and determines where to route the packet, based at least in part on a request associated with the packet. The core service layer is configured to employ the request associated with the packet to provide the packet to at least one mobile edge service.

According to another aspect of the invention, an apparatus is directed to enabling a mobile edge service. The apparatus includes an interface component, a mobile service switch, a core service component, and a protocol stack. The interface component is configured to receive a packet from at least one of a wireless application, a WNI, a Gi interface, and a Gn interface. The mobile service switch is configured to receive the packet from the interface component, and to determine where to route the packet, based at least in part on a request associated with the packet. The core service component is configured to employ the request associated with the packet and to provide the packet to at least one mobile edge service. The protocol stack is configured to manage an interaction between at least one of the interface component, the mobile service switch, and the core service component.

According to yet another aspect of the invention, a protocol stack is directed to enabling a mobile edge service. The protocol stack includes, a forwarding layer, a signaling layer, a lookup layer, an enhanced-services signaling layer, an enhanced-services core layer, a mobile edge services layer, and a mobile edge services configuration and monitoring layer. The forwarding layer is configured to receive a packet from at least one of a wireless application, a WNI, a Gi interface, and a Gn interface, and to forward the packet to at least one of a switch, and a core service layer. The signaling layer is configured to forward the packet based on a control signal associated with the packet. The lookup layer is configured to examine content associated with the packet, and to route the packet based on the examined content. The enhanced-services signaling layer configured to determine a service type associated with the packet, and to route the packet based on at least one of the service type, the control signal associated with the packet, and the examined content. The enhanced-services core layer is configured to enable an interaction between the core service layer and at least one mobile edge service. The mobile edge services layer is configurable to provide at least one mobile edge service. Moreover, the mobile edge services configuration and monitoring layer is configured to manage each interaction between each layer.

According to still another aspect of the invention, a method is directed to enabling a mobile edge service. The method includes receiving a packet from at least one of a wireless application, and a WNI. The method further includes routing the packet to a mobile edge service based on at least one of content associated with the packet, a service type associated with the packet, and a control signal associated with the packet.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The terms "mobile node, mobile device, and mobile terminal" refer to a node on a wireless network that is mobile.

The term "signal" means at least one control current signal, voltage signal, or packet control signal. The term "flow" refers to a flow of packets. The term "traffic" means a flow of at least one packet.

The term "Gi" means a reference interface between a Gateway General Packet Radio Service (GPRS) Support Node (GGSN) and an external packet network, such as the Internet.

The term "Gn" means a reference interface between two GPRS nodes, such as a GGSN, a smart GGSN, and a Serving GPRS Support node (SGSN), typically within the same Public Land Mobile Network (PLMN).

The term "Gr" means a reference interface between an SGSN and a Home Location Register (HLR).

The term "service providers" means providers of services for a mobile node, operators, mobile network operators, smart GGSN owners, and the like.

The meaning of "a," "an," and "the" include plural references. The meaning of "in" includes "in" and "on."

Additionally, a reference to the singular includes a reference to the plural unless otherwise stated or is inconsistent with the disclosure herein.

Briefly stated, the present invention is directed to a system and method for enabling Mobile Edge Services (MES) in a mobile network. The system enables a smart Gateway General Packet Radio Service Support Node (GGSN) to securely communicate with an MES application layer to provide content delivery services, network services, and application services to a subscriber. By enabling such additional services to be provided to a subscriber in an integrated manner, a service provider may maximize their value to the subscriber by providing content portals, and other value-added services. The method is directed to enabling components in a smart GGSN to provide a protocol stack that includes control, data, and management interfaces that enable a service provider to deliver value-added services to their subscribers.

Illustrative Environment

Figure 1:
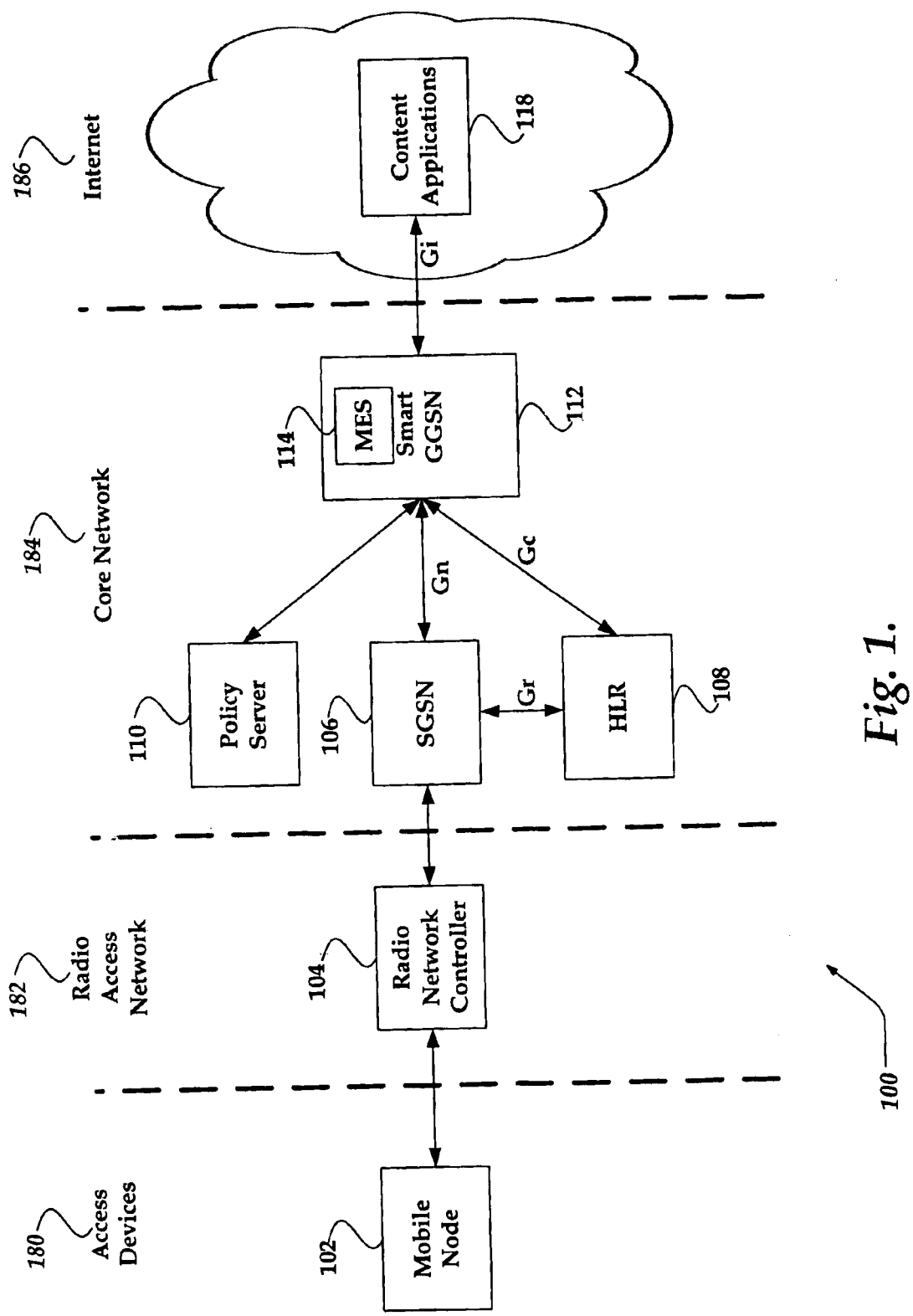
FIG. 1 illustrates a block diagram generally showing an overview of one embodiment of a mobile network.

FIG. 1 illustrates a block diagram generally showing an overview of one embodiment for a mobile network in which the present invention may operate. As shown in the figure, the topography for mobile network 100 includes four categories of systems, i.e., access devices 180, Radio Access Network (RAN) 182, Core Network 184, and Internet 186.

Access devices 180 includes mobile node (MN) 102, and the like. Radio Access Network (RAN) 182 may include access routers and base stations (AR/BS) (not shown), Radio Network Controller (RNC) 104, and the like. Core Network 184 can include Serving GPRS Support node (SGSN) 106, Home Location Register (HLR) 108, Policy Server (PS) 110, Smart GGSN 112, and the like. Smart GGSN 112 can also include Mobile Edge Services (MES) 114. Internet 186 can include content applications 118. Mobile network 100 may include many more components than those shown in FIG. 1. However, the components shown are sufficient to disclose an illustrative embodiment for practicing the invention.

As further shown in the figure, RNC 104 is in communication with MN 102, and SGSN 106. SGSN 106 is in communication with HLR 108 and Smart GGSN 112. Smart GGSN 112 is also in communication with policy server 110, and content applications 118.

Generally, MN 102 may include any access device capable of connecting to a wireless network. Such devices include cellular telephones, smart phones, pagers, radio frequency (RF) devices, infrared (IR) devices, integrated devices combining one or more of the preceding devices, and the like. MN 102 may also include other devices that have a wireless interface, such as Personal Digital Assistants (PDAs), handheld computers, personal computers, multiprocessor systems, microprocessor-based or programmable consumer electronics, network PCs, wearable computers, and the like.

Radio Access Network (RAN) 182 is directed to handling actions associated with radio resource management, control of a radio connection, control of a radio transmission, and many other actions that may be related to traditional radio access systems.

RNC 104 includes hardware and related software that interfaces with core network 184, controls radio transmitters and receivers in the AR/BS, and performs other radio access and link maintenance actions. RNC 104 also performs mobility actions, including physical location, cell structure actions, handovers of MN 102, and the like. RNC 104 also provides information to smart GGSN 112 about MN 102, such as a mobile device characteristic, a network negotiated bandwidth, a location of the subscriber, and the like. RNC 104 may be substantially similar to a base station location as operated in a second generation (2G) or greater network.

Core Network 184 includes a variety of components that support context transfer of authentication for mobile nodes moving between single hop and multi-hop connections. Therefore, authentication, authorization and accounting network entities supporting the underlying network may be part of the corresponding elements in the infrastructure such that each mobile node connected by single or multiple hops to the network can individually authenticate to a subscriber control element.

Serving GPRS Support Node (SGSN) 106 includes software and related hardware that is configured to support the delivery of data packets to MN 102 within a geographical service area. SGSN 106 is also configured to perform packet routing and transfer, mobility management (attach/detach and location management), and logical link management, and the like. SGSN 106 is further configured to authenticate MN 102 to mobile network 100, by determining validity of an subscriber of MN 102, whether MN 102 is associated with a selected service provider, and whether MN 102 may appropriately conduct communications over mobile network 100. SGSN 106 may also employ HLR 108 to perform authentication actions, as well as other gating actions.

HLR 108 includes software and related hardware that is configured to provide a database structure for semi-permanent subscriber information for users of mobile devices. HLR 108's subscriber information includes, but is not limited to, International Mobile Subscriber Identity (IMSI), service subscription information, location information, identity of a currently serving Visitor Location Register (VLR), and the like, to enable routing of mobile-terminated calls. HLR 108's subscriber information further includes at least one service restriction, and or other supplementary service information.

PS 110 includes software and related hardware that is configured to provide a database structure for policy information about a subscriber. Such policy information may include, but is not limited to, what services MN 102 may access.

Smart GGSN 112 is described in more detail in conjunction with FIGS. 2–7 below. Briefly however, Smart GGSN 112 includes software and related hardware configured as a gateway for MN 102 to access Internet 186, a public data network, a specified private IP network, and the like. Smart GGSN 112 may perform traditional gateway actions such as publishing subscriber addresses, mapping addresses, routing, and tunneling packet, screening packets, and counting packets. Smart GGSN 112 may further include Domain Name Server (DNS) functions enabled to map routing area identifiers with serving SGSNs and Dynamic Host Configuration Protocol (DHCP) functions to allocate dynamic IP addresses to MN 102.

Smart GGSN 112 communicates with content applications 118 employing connectionless network protocols, such as Internet Protocol (IP) and the Open System Interconnect (OSI) connectionless network protocol, or connection-oriented protocols such as X.25, X.75, and the like.

Moreover, smart GGSN 112 is arranged to receive information from PS 110, and RNC 104, along with information about MN 102 from HLR 108, and to determine a personalized policy for MN 102. Smart GGSN 112 can employ the personalized policy to communicate information and requests to content applications 118.

MES 114 includes software and related hardware to enable smart GGSN 112 to provide content delivery services, network services, and application services to MN 102. Content delivery services may include caching, content delivery networking, edge streaming, and edge application delivery, and the like. Network services can include performance-enhancing proxies (PEP), carrier managed IP Virtual Private Network (VPN), security, and the like. Application Services may include interactive games, videoconferences, and the like.

Although MES 114 is illustrated in operation with smart GGSN 112, the present invention is not so limited. For example, smart GGSN 112 and MES 114 may be deployed as components across several larger components and systems, or as separate components, without departing from the scope or spirit of the present invention.

Internet 186 includes any form of computer readable media for communicating information from one electronic device to another. Internet 186 can include public data networks, specified private networks, local area networks (LANs), wide area networks (WANs), direct connections, such as through a universal serial bus (USB) port, other forms of computer-readable media, and any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), and the like. Furthermore, remote computers and other related electronic devices can be remotely connected to either LANs or WANs via a modem and temporary telephone link.

The media used to transmit information in the links illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Content applications 118 include software and related hardware configured to provide services and information for MN 102.

Illustrative Smart GGSN

Figure 2:
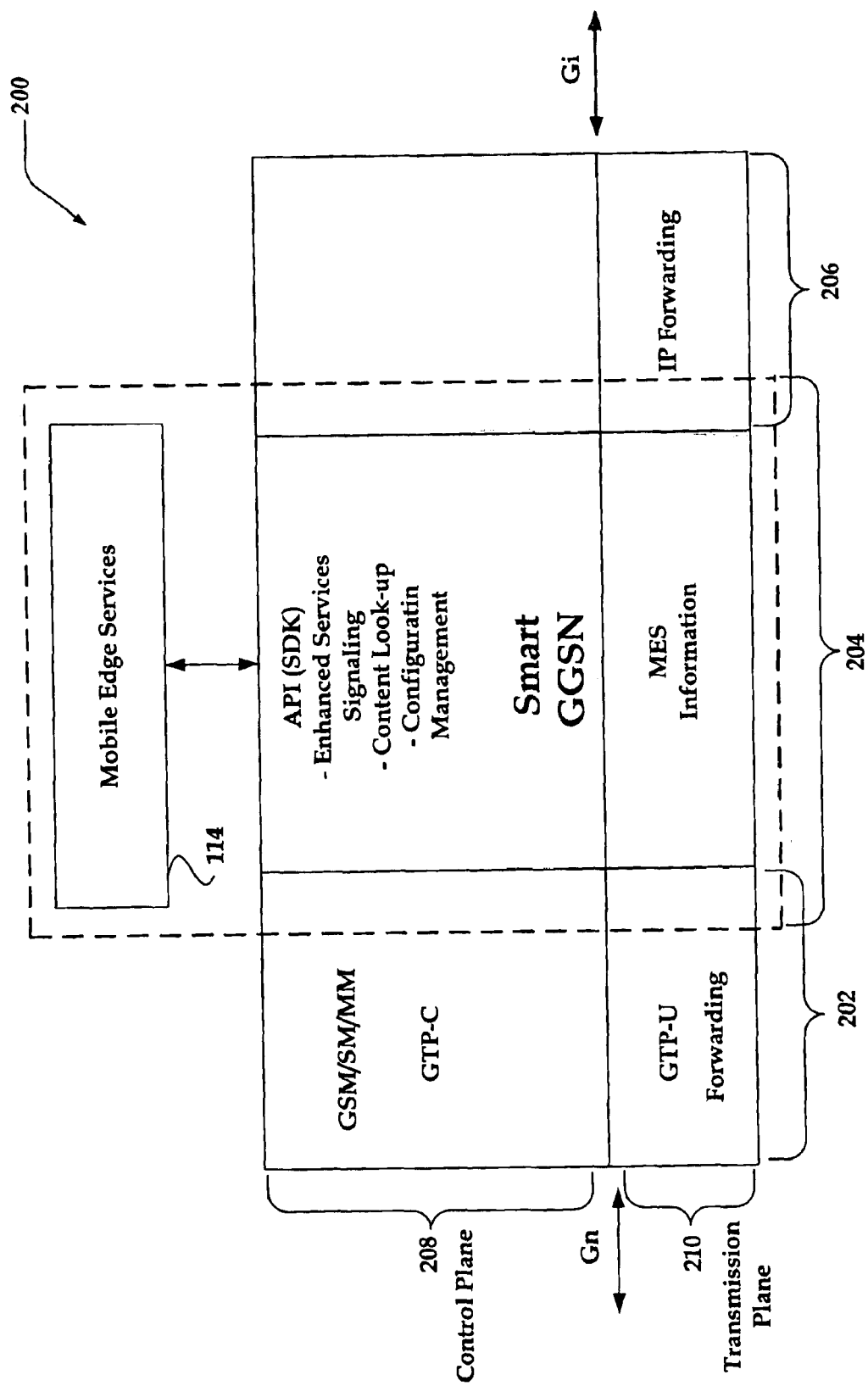
FIG. 2 illustrates a functional block diagram of one embodiment of a general transmission plane of the smart GGSN of FIG. 1.

FIG. 2 illustrates a functional block diagram of one embodiment of a general apparatus 200 for the smart GGSN shown in FIG. 1. As illustrated, general apparatus 200 includes control plane 208, and transmission plane 210.

Control plane 208 integrates MES 114 with a smart GGSN to provide network and other subscriber information at the mobile edge, thereby enabling service providers, and the like to apply value-added services before transferring the received traffic. As such, control plane 208 enables a smart GGSN to appear as a servicing network node with mobile edge services, and not just a termination interface between a mobile session and an IP session.

Transmission plane 210 includes GPRS Tunneling Protocol (GTP) 202, smart GGSN 204, and IP Forwarding 206. Smart GGSN 204 includes Mobile Edge Services (MES) 114. GTP 202 includes GTP for a user packet (GTP-U), and GTP for a (Control) signaling packet (GTP-C).

GTP 202 enables IP mobility tunnels within Global System for Mobility Communications (GSM) user data and signaling packets between GPRS Support Nodes (GSNs). As such, GTP is supported by Transmission Control Protocol for connection-oriented transmission, and User Datagram Protocol (UDP) for connectionless transmission. GTP employs a tunneling mechanism to carry a packet, where a tunnel is typically a two-way, point-to-point path. Tunneling transfers encapsulated information between GSNs from a point of encapsulation to another point for decapsulation. GTP may employ an out-of-band signaling packet so that signaling paths (GTP-C) are logically distinct from data paths (GTP-U). GTP is further enabled to perform path management, tunnel management, location management, Service Management (SM), and mobility management (MM). GTP 202 actions typical take place at the Gn interface.

IP Forwarding 206 typically takes place at the Gi interface and enables traditional Internet Protocol (IP) actions such as IP tunneling, encryption, Virtual Private Networking (VPN), routing, and the like. Such actions may be described in a protocol reference, such as a Request for Comments (RFC), and the like.

Smart GGSN 204 includes software and related hardware that is configured to integrate mobile edge service (MES) 114 with such traditional GGSN services as described above, as well as enhanced services signaling, content lookup, and configuration management. By integrating smart GGSN 204, GTP 202, and IP forwarding 206, the invention enables information from the GTP 202 interface to be integrated with information from the IP forwarding 206 interfaces to provide new opportunities for revenue and control by a service provider at the mobile edge.

Figure 3:
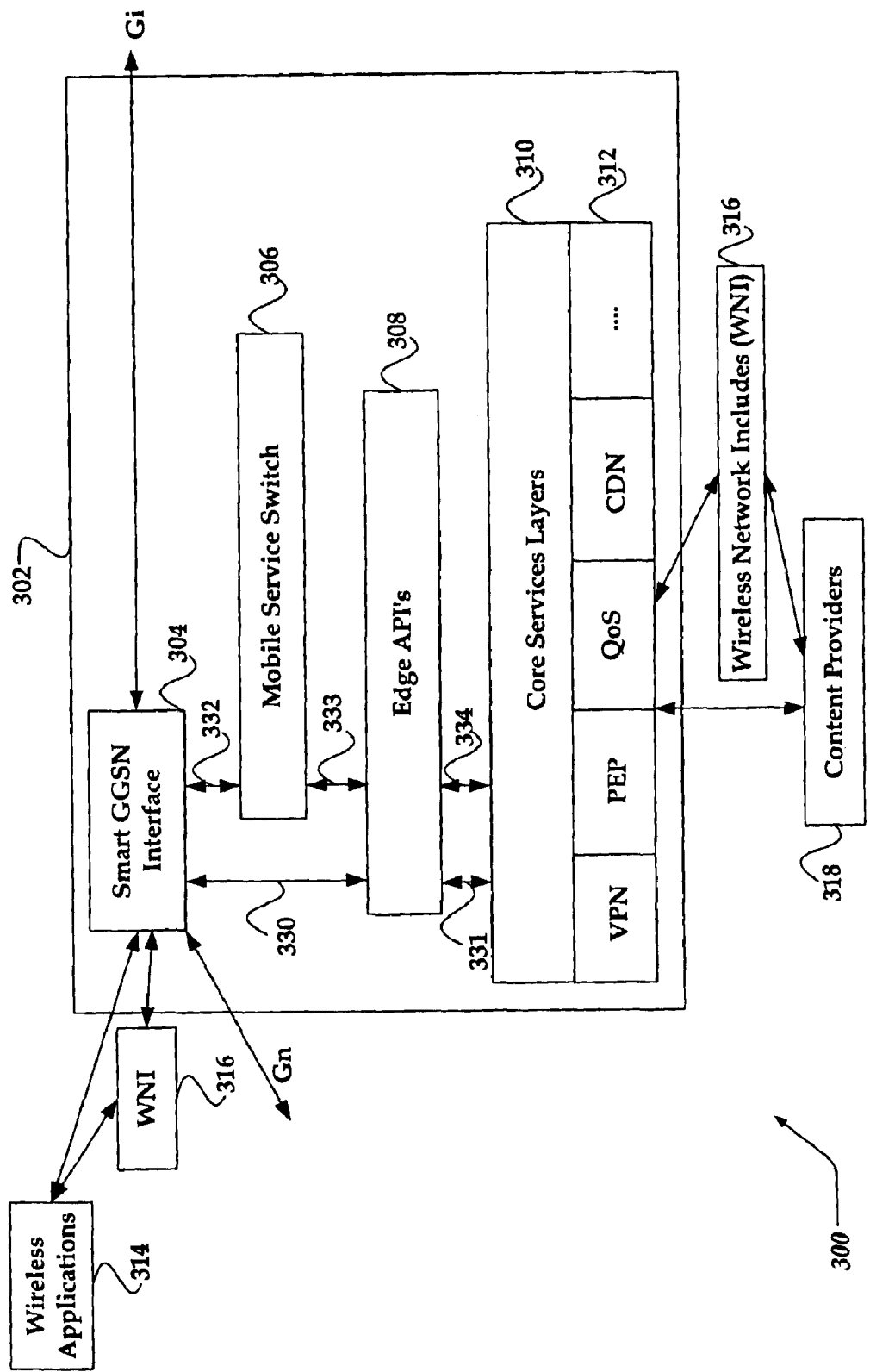
FIG. 3 is a functional block diagram of an embodiment of a smart GGSN employing components for enabling Mobile Edge Services (MES)

FIG. 3 is a functional block diagram of an embodiment of a smart GGSN employing components for enabling MES. As shown, system 300 includes smart GGSN 302, wireless applications 314, content providers 318, and WNI 316.

Smart GGSN 302 is substantially similar to smart GGSN 204 of FIG. 2, and smart GGSN 112 of FIG. 1. Smart GGSN 302 includes smart GGSN Interface 304, Mobile service switch (MSS) 306, Edge Application Programming Interfaces (APIs) 308, core service layer 310, and technology elements 312.

Wireless Applications 314 is in communication with WNI 316, and smart GGSN Interface 304. Smart GGSN Interface 304 is in communication with Edge APIs 308, and MSS 308. MSS 306 is also in communication with Edge APIs 308. Core service layer 310 is also in communication with Edge APIs 308, and technology elements 312. Technology elements 312 are also in communication with WNI 316, and content providers 318.

Wireless applications 314 include software applications that are configured to provide subscriber services, and information for mobile nodes, such as MN 102 of FIG. 1. Wireless applications 314 may be hosted on a variety of sources including a content delivery provider 318's server, a service provider server, and the like.

WNI 316 includes software for managing wireless content transparently across application solutions, content infrastructures, and content management and wireless delivery infrastructures. WNI 316 enables XML-based markup languages, or the like to dynamically assemble resources in a wireless device, such as MN 102 in FIG. 1. WNI 316 enables leveraging of client tools, such as caching, to improve subscriber perceived performance, reduce processing overhead on a wireless application server, and enhance availability of information. For example, employing WNI 316, a Content Delivery Node (CDN) may dynamically assemble information at the mobile edge based on such features as a mobile device characteristic, a network negotiated bandwidth, an subscriber personalized policy, and location of the subscriber. WNI 316 may communicate with smart GGSN 302 to direct actions that enable the assembly of the information for the subscriber.

Smart GGSN interface 304 includes software and related hardware configured to receive traffic on the Gn interface, the Gi interface, and from wireless applications 314. Smart GGSN interface 304 is further configured to process the received traffic, and route it to an appropriate destination, such as MSS 306, MN 102, or some other destination accessed over the Internet.

MSS 306 includes software and related hardware configured to determine where to route the received traffic based at least in part on a mobile edge service request that is associated with the received traffic. MSS 306 may employ a combination of information about traffic, such as type, source, destination, subscriber personalized policy, and the like to reroute the traffic towards the technology element(s) 312 that is associated with the requested mobile edge service. MSS 306 may employ Edge APIs 308, and core service layer 310 to manage the traffic rerouted to (or from) technology element(s) 312. MSS 306 may further collect and process statistics associated with the routed traffic.

Core service layer 310 includes software and related hardware configured to perform intelligent traffic management to technology elements 312. Intelligent traffic management actions include determining which technology element to direct the traffic to first, queues, buffers, and the like.

Technology elements 312 include software and related hardware to provide mobile edge services that are enabled to process the received traffic. Mobile edge services may use technology elements 312 which include, but are not limited to Virtual Private Networking (VPN), Performance Enhancing Proxies (PEP), Quality of Services (QoS), Content Delivery Networking (CDN), caching, and the like. Mobile edge services within technology elements 312 may interact with content providers 318 to enable enhanced services to the subscriber.

Operationally, traffic typically arrives at smart GGSN interface 304 through the Gn interface from MN 102 of FIG. 1. Smart GGSN interface 304 makes a determination whether the received traffic is to be processed by smart GGSN 302. If it is determined that the received traffic is not to be processed by smart GGSN 302, smart GGSN interface 304 forwards the received traffic to a destination on Internet 186 via the Gi interface.

Alternatively, if it is determined that smart GGSN 302 is to process the received traffic, smart GGSN interface 304 may forward it to MSS 306, where a determination is made how to further process the received traffic. MSS 306 integrates information received from policy server 110, HLR 108, and SGSN 106 to determine how to process the received traffic. Employing Edge APIs 308, and core service layer 310, MSS 306 directs the traffic to other parts of the mobile edge service for further processing.

Upon receiving the traffic, the mobile edge service processes the traffic, employing information from content providers 318, and the like. The processed traffic or an associated response is then routed back up through core service layer 310, edge APIs 308, and optionally MSS 306, to smart GGSN interface 304. Smart GGSN interface 304 then employs either the Gn or Gi interface to route the process traffic or associated response to its destination.

Functional Protocol Stack

Figure 6:
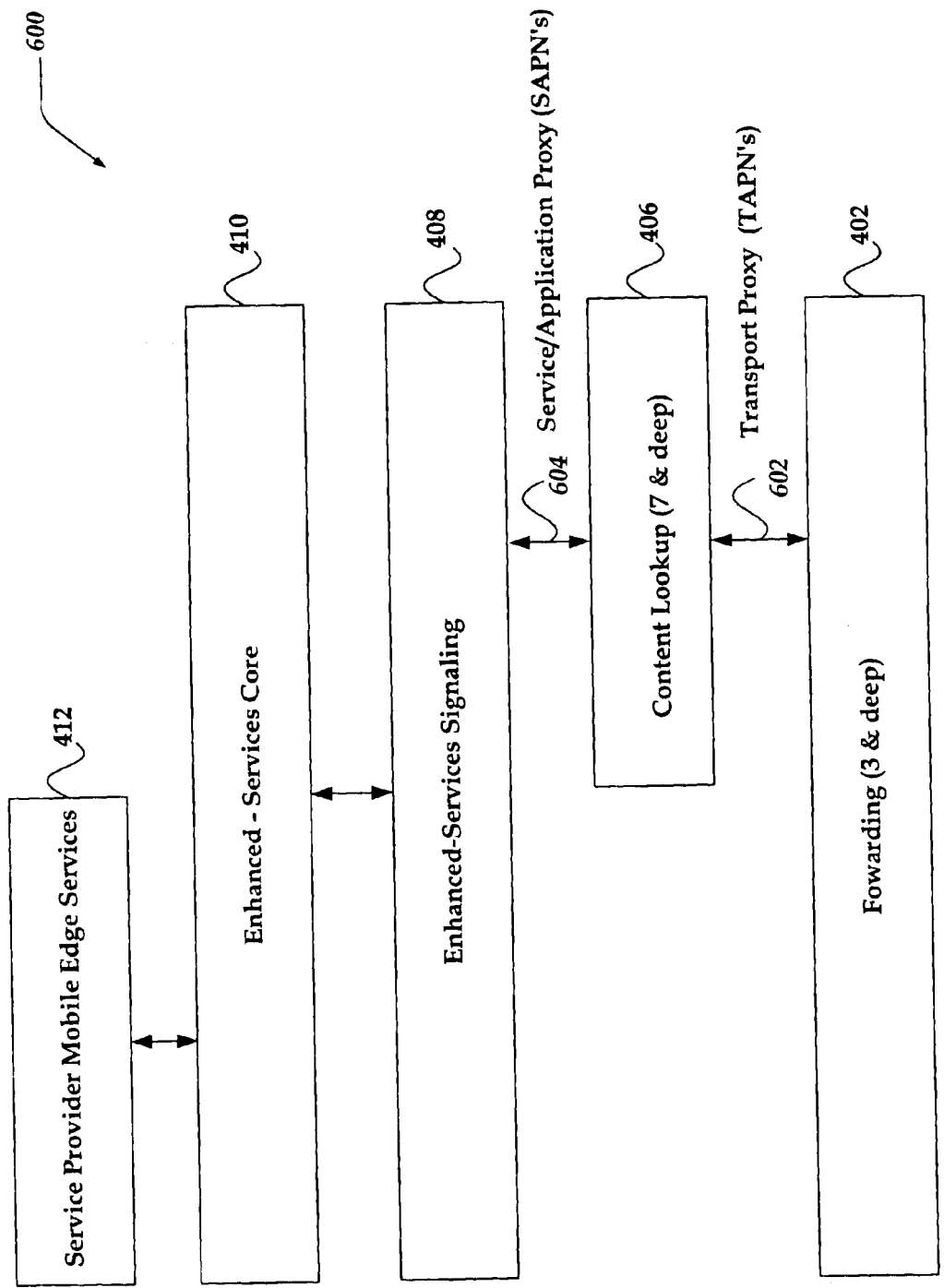
FIG. 6, is a functional block diagram of an embodiment of a data plane for the protocol stack illustrated in FIG. 4.
Figure 7:
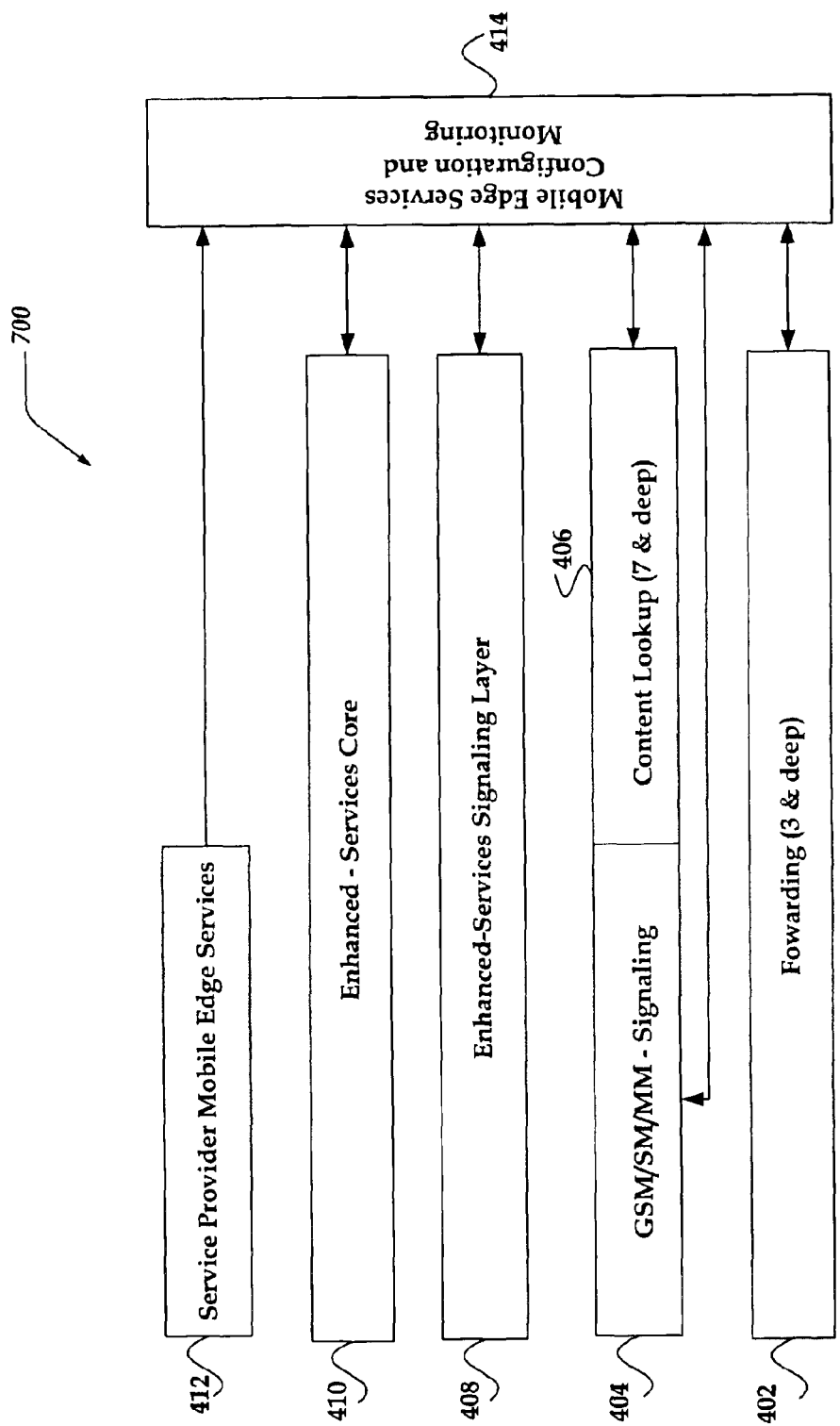
FIG. 7 is a functional block diagram of an embodiment of a management plane for the protocol stack illustrated in FIG. 4, in accordance with aspects of the invention.

A functional protocol stack will now be described with respect to FIG. 4, which is a functional block diagram illustrating an embodiment of the present invention. FIGS. 5–7 are employed to illustrate one embodiment of interactions of the protocol stack layers shown in FIG. 4. Briefly, FIGS. 5–7 illustrate a control plane interaction, a data plane interaction, and a management plane interaction, respectively, between the layers in the protocol stack shown in FIG. 4. It is understood that other combinations and arrangements of the layers in the protocol stack may be employed without departing from the scope or spirit of the present invention.

Protocol stack 400 is directed to enabling a packet to traverse the components of smart GGSN 302 as illustrated in FIG. 3. As shown in FIG. 4, protocol stack 400 includes forwarding layer 402, GSM/SM/MM signaling layer 404, content lookup layer 406, Enhanced-Services Signaling Layer 408, Enhanced-Services Core layer 410, Service Provider Mobile edge services layer 412, and Mobile edge services Configuration and Monitoring layer 414.

Forwarding layer 402 includes software that is directed to routing of a packet through the components of smart GGSN 302 of FIG. 3. Forwarding layer 402 enables routing of a packet at least up to layer 3 of the Open Systems Interconnection (OSI) reference model for networking. In one embodiment, forwarding layer 402 includes routing up to layer 7 of the OSI reference model. Forwarding layer 402 can examine a header associated with the packet to determine how to route the packet.

GSM/SM/MM signaling layer 404 includes software that is directed to managing signaling traffic and similar related control traffic, received at the Gn interface of smart GGSN 302 of FIG. 3. Based on at least one characteristic associated with the incoming signaling traffic, GSM/SM/MM signaling layer 404 consolidates and directs the incoming signaling traffic through various components included with smart GGSN 302. A characteristic associated with the incoming signaling traffic may identify a subscriber, provide information regarding the subscriber's personalized policy, and what action is requested by the signaling traffic.

Content Lookup layer 406 is directed to examining a packet's content to determine how to route the packet. In one embodiment, content lookup layer 406 is included within MSS 306 as shown in FIG. 3.

Enhanced-Services Signaling layer 408 is directed to binding the lower protocol layers with the upper protocol layers. Enhanced-Services Signaling layer 408 examines signaling traffic, content traffic, and a service type associated with the packet to determine how to further process the packet. In one embodiment, Enhanced-Services Signaling layer 408 is represented by paths 330–334 of FIG. 3.

Enhanced-Services Core layer 410 enables the operation of Edge APIs 308, core service layer 310, and technology elements 312 and their associated interactions. Enhanced-Services Core layer 410 can also include mobile edge services, service provider developed services, and the like.

Service Provider mobile edge services layer 412 includes software that is directed to operator developed services, applications, and the like.

Mobile edge services Configuration and Monitoring layer 414 includes software directed to managing, and controlling the interactions between the layers in protocol stack 400.

Figure 4:
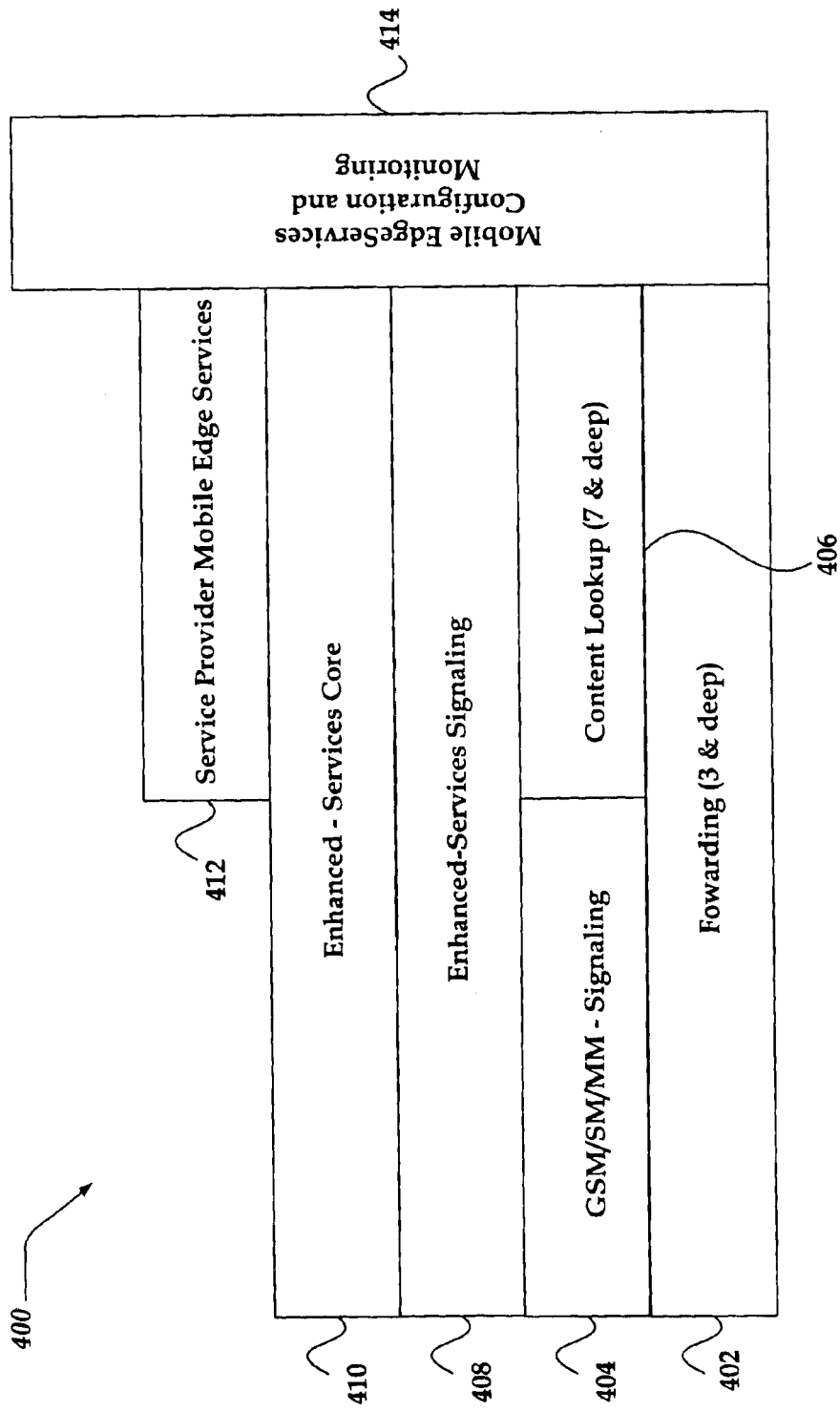
FIG. 4 is a functional block diagram of an embodiment of a protocol stack for enabling interactions of the smart GGSN components illustrated in FIG. 3.
Figure 5:
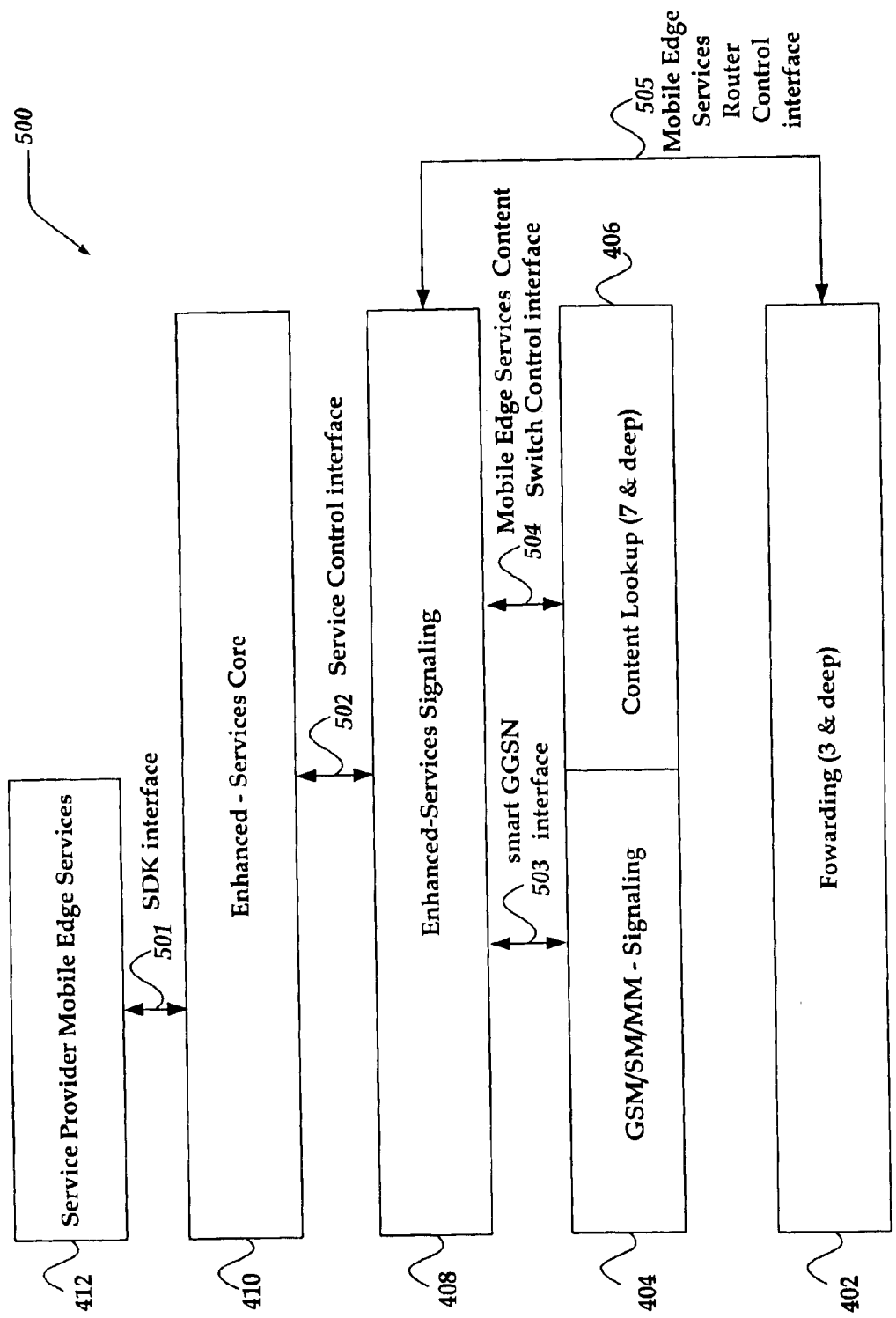
FIG. 5 is a functional block diagram of an embodiment of a control plane for the protocol stack illustrated in FIG. 4.

FIG. 5 is a functional block diagram of an embodiment of a control plane for the components illustrated in FIG. 4. Control plane 500 describes how a packet flow is modified, how an subscriber may receive the packet, what packet an subscriber may be allowed to receive, what services an subscriber associated with the packet is registered to access, and the like based at least in part on a control signal associated with the packet.

As shown in FIG. 5, control plane 500 includes Software Development Kit (SDK) interface 501, services control interface 502, smart GGSN interface 503, mobile edge services content switch control (ECSC) interface 504, and mobile edge services router control (ERC) interface 505.

SDK interface 501 is directed to enabling a service provider to dynamically develop s mobile edge service with an subscriber personalized policy, and the like.

Services control interface 502 includes software that enables signaling and registration interactions between Enhanced-Services Core layer 410 and Enhanced-Services Signaling Layer 408 through a service registration protocol. Services control interface 502 is directed to provide service management functions, such as registration, prioritization, cleanup, and the like. Services control interface 502 is also directed to provide GGSN proxy actions, typically by performing Packet Data Protocol (PDP) proxy agent actions, and the like. Moreover, services control interface 502 also enables control of resources, and general packet movement. Through the bi-directional, peer-to-peer service registration protocol, services control interface 502 enables a service to register itself with Enhanced-Services Signaling layer 408. In one embodiment, services control interface 502 includes a common resource that may be shared across various mobile edge services. In another embodiment, services control interface 502 includes a database structure for services to store information associated with signaling traffic, data traffic, configuration traffic, and the like.

Smart GGSN interface 503 is configured to provide a proxy interface to a PDP signaling plane (not shown). Smart GGSN interface 503 further enables services to access a state transition of a PDP context within smart GGSN 302 of FIG. 3. Such actions enable modification of data movement relevant to a service. Moreover, Smart GGSN interface 503 may be employed by a service to query a system within a General Packet Radio Services/Universal Mobile Telecommunications System (GPRS/UMTS) network, or the like, that may be reachable by smart GGSN 302 of FIG. 3. Smart GGSN interface 503 also enables additional information to be associated with a PDP field while maintaining traditional mechanisms for communication.

Smart GGSN interface 503 is configured to provide a packet to a Packet Data Protocol (PDP) proxy agent based at least in part on the control signal associated with the packet. Smart GGSN interface 503 may send the signaling packet to the proxy, and wait for a response. Alternatively, Smart GGSN interface 503 may retain the signaling packet and send a copy of the signaling packet to the proxy, and not wait for a response. In one embodiment, Smart GGSN interface 503 is a transparent interface. In another embodiment, Smart GGSN interface 503 is a non-transparent interface.

Moreover, Smart GGSN interface 503 can employ actions and events, and a decision set to manage a signaling packet arising in the GGSN control plane. The decision set may apply on a global basis to all incoming signaling packets, a signaling packet type, a subscriber type, a particular subscriber, and an occurrence of a predetermined event.

Mobile edge services content switch control (ECSC) interface 504 provides a switch resource control protocol, and a switch redirect and classification protocol. The switch resource control protocol enables the control of resources such as GSM/SM/MM signaling resources, Content Lookup resources, forwarding, and the like. The switch redirect and classification protocol enables the services to manage traffic flow.

The switch resource control protocol enables a state based global resource map and a state based per flow resource map for Content Lookup 406. Switch resource control protocol is directed to managing a resource that may be controlled or modified in a resource switch. Switch resource control protocol further manages a resource through initialization, modification, status query, mapping of the resource, and the like.

The switch redirect and classification protocol is employed to create, modify, delete, and generally manage a content signature that may determine a nature of traffic flow through a content switch. Switch redirect and classification protocol may also manage the content signature through an action/event structure that includes an Access Point Name (APN) mapping, a status/query, a cleanup, an action mapping, and the like.

Mobile edge services router control (ERC) interface 505 can include a router resource control protocol, and a router redirect and classification protocol. Router resource control protocol enables the control of router resources such as GSM/SM/MM signaling router resources, content lookup router resources, forwarding, and the like. The router redirect and classification protocol enables mobile edge services to manage traffic flow associated with a router. Router resource control protocol and router redirect and classification protocol are substantially similar to the switch resource control protocol and switch redirect and classification protocol described above in conjunction with ECSC interface 504. However, while the protocols of ECSC interface 504 are applicable to a switch, the protocols associated with ERC interface 505 are applicable to a router.

FIG. 6 is a functional block diagram of an embodiment of a data plane for the components illustrated in FIG. 4. Data plane 600 enables routing of a packet through the various services in protocol stack 400 of FIG. 4 based at least in part on content associated with the packet. Data plane 600 includes a transport proxy protocol and a service proxy protocol.

The transport proxy protocol enables a Transport Access Point Name (TAPN) that associates an APN with an IP address, PDP signature, International Mobile Subscriber Identity (IMSI), or the like based on an OSI layer 3 packet lookup table. A transport proxy is uniquely identified by its TAPN. However, several TAPN's may identify the same transport proxy.

The service proxy protocol enables a Service Access Point Name (SAPN) that associates a TAPN with a content signature, such as a Universal Resource Locator (URL), and the like, that is based on an OSI layer 7 content lookup. A service proxy is uniquely identified by a SAPN. However, several SAPN's may identify the same service.

FIG. 7 is a functional block diagram of an embodiment of a management plane for the components illustrated in FIG. 4, in accordance with aspects of the invention. Management plane 700 can include a user interface subsystem; consolidation/verification/licensing and authorization subsystem; information management subsystem; network transport delivery subsystem; alarm and health check subsystem; service monitoring and real time management subsystem; statistics collector subsystem; QoS, Traffic, and Policy translator subsystem; and a subscriber management subsystem (not shown). These subsystems enable management plane 700 to configure and manage the services of protocol stack 400 of FIG. 4. The subsystems employ a service integration thread that is directed to consolidating a minimum set of protocol components. The minimum set of protocol components are determined based at least in part on a policy, a request associated with the packet, a control signal associated with the packet, content associated with the packet, subscriber provided information, and the like. The subsystems of management plane 700 employs the determined minimum set of protocol components to transparently translate a request for a mobile edge service into a parameter suitable for each protocol layer identified in the minimum set of protocol components. Management plane 700 thereby enables a dynamic run time configuration and monitoring of the components described above in FIGS. 2–4.

Management plane 700 further enables a master/slave protocol that includes a network transport delivery mechanism, a configuration engine for managing a synchronous transaction, a monitoring and health check engine for managing an asynchronous transaction, and an arbitrage engine to manage local configurations to allow them to co-exist.

It will be understood that each layer of the protocol stack, and combinations of these layers, can be implemented by computer program instructions. These program instructions may be provided to a processor to produce a machine, such that the instructions, which execute on the processor, create means for implementing the actions specified in the protocol stack. The computer program instructions may be executed by a processor to cause a series of operational steps to be performed by the processor to produce a computer implemented process such that the instructions, which execute on the processor provide steps for implementing the actions specified in the protocol stack or stacks.

Accordingly, layers of the protocol stack illustration support combinations of means for performing the specified actions, combinations of steps for performing the specified actions and program instruction means for performing the specified actions. It will also be understood that each layer of the protocol stack illustrations, and combinations of layers in the protocol stack illustrations, can be implemented by special purpose hardware-based systems which perform the specified functions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. An apparatus for enabling a mobile edge service, comprising:
    a smart Gateway General packet radio service Support Node (GGSN) interface that is configured to receive a packet from at least one of a wireless application, and a Wireless Network Includes (WNI);
    a switch that is configured to receive the packet from the smart GGSN interface, and determines where to forward the packet, based at least in part on a request associated with the packet;
    a core service layer that is configured to employ the request associated with the packet to provide the packet to at least one mobile edge service; and
    a protocol stack means for managing an interaction between the smart GGSN interface, the switch, and the core service.

2. The apparatus of claim 1, further comprising an edge Application Programming Interface (API) that is configured to enable communication between the switch and the core service layer.

3. The apparatus of claim 1, wherein the WNI is further configured to manage wireless content for at least one of an application, a content, and a wireless delivery mechanism.

4. The apparatus of claim 1, wherein the WNI manages wireless content with an XML-based markup language.

5. The apparatus of claim 1, wherein the smart GGSN interface is further configured to receive the packet from at least one of a Gi interface, a wireless application, and a Gn interface.

6. The apparatus of claim 1, wherein the switch is further configured to route the packet based on at least one of a packet type, a packet source, a packet destination, and a policy associated with the packet.

7. The apparatus of claim 6, wherein the policy associated with the packet further comprises at least one of a characteristic of a mobile device, bandwidth, International Mobile Subscriber Identity (IMSI), service subscription, Visitor Location Register (VLR), and access privilege.

8. The apparatus of claim 1, further comprising a protocol stack that is configured to manage each interaction between the smart GGSN interface, the switch, and the core service layer.

9. The apparatus of claim 8, wherein the protocol stack further comprises:
   a control plane that is configured to forward the packet based at least in part on a control signal associated with the packet;
   a data plane that is configured to forward the packet based at least in part on content associated with the packet; and
   a management plane that enables a set of components in the protocol stack to provide the packet to at least one mobile edge service.

10. The apparatus of claim 8, wherein the protocol stack employs a minimum set of components that are determined in part by at least one of a policy, a request associated with the packet, a control signal associated with the packet, and content associated with the packet.

11. A protocol stack for enabling a mobile edge service, comprising:
   a forwarding layer configured to receive a packet from at least one of a wireless application, a Wireless Network Includes (WNI), a Gi interface, and a Gn interface, and to forward the packet to at least one of a switch, and a core service layer;
   a signaling layer configured to forward the packet based on a control signal associated with the packet;
   a lookup layer configured to examine content associated with the packet, and to route the packet based on the examined content;
   an enhanced-services signaling layer configured to determine a service type associated with the packet, and to route the packet based on at least one of the service type, the control signal associated with the packet, and the examined content;
   an enhanced-services core layer configured to enable an interaction between the core service layer and at least one mobile edge service;
   a mobile edge services layer configurable to provide at least one mobile edge service;
   a mobile edge services configuration and monitoring layer configured to manage each interaction between each layer; and
   a data plane that includes:
      a transport proxy protocol configured to identify a transport proxy based at least in part on a Transport Access Point Names (TAPN), wherein the TAPN comprises an Access Point Name (APN), and a signature based at least in part on an Open System Interconnect (OSI) layer 3 packet lookup; and
      a service proxy protocol configured to identify a service proxy based at least in part on a Service Access Point Name (SAPN), where the SAPN comprises the TAPN, and a content signature based at least in part on an OSI layer 7 content lookup.

12. The protocol stack of claim 11, further comprising:
   a control plane that is configured to forward the packet to at least one protocol layer based at least in part on the control signal associated with the packet; and
   a management plane that is configured to determine a set of components in the protocol stack to enable the packet to access at least one mobile edge service.

13. The protocol stack of claim 11, further comprising a control plane that includes:
   a services control interface configured to enable at least one of signaling, and a registration interaction between the enhanced-services core layer and the enhanced-services signaling layer;
   a smart Gateway General packet radio service Support Node (GGSN) interface configured to provide the packet to a Packet Data Protocol (PDP) proxy agent based at least in part on the control signal, associated with the packet; and
   a resource control protocol configured to enable a mobile edge service to route the packet to at least one of a switch, and a router.

14. The protocol stack of claim 11, further comprising a smart GGSN interface that is configured to query a system in a General Packet Radio Services/Universal Mobile Telecommunications System (GPRS/UMTS) network.

15. The protocol stack of claim 11, further comprising a smart GGSN interface that enables one of a transparent, and a non-transparent interface.

16. The protocol stack of claim 11, further comprising a smart GGSN interface that is configured to perform actions, including:
   if a PDP proxy response is associated with the packet, sending the packet to a PDP proxy agent;
      receiving the PDP proxy response from the PDP proxy agent; and if the PDP proxy response is unassociated with the packet, sending a copy of the packet to the PDP proxy agent.

17. The protocol stack of claim 11, further comprising a smart GGSN interface that is configured to enable the enhanced-services signaling layer to forward a control signal associated with the packet based on at least one of control signal type, subscriber type, and occurrence of a predetermined event.

18. The protocol stack of claim 11, further comprising a services control interface that is configured to provide a bi-directional, peer-to-peer service registration protocol.

19. The protocol stack of claim 11, further comprising a resource control protocol that is configured to perform at least one action including initialization, modification, status query, and mapping of a mobile edge service.

20. A method for enabling a mobile edge service, comprising:
   enabling a smart GGSN to receive a packet from a Wireless Network Includes (WNI);
   employing a switch to determine where to forward the received packet, based at least in part on a request associated with the packet;
   providing the packet to a mobile edge service based on at least one of content associated with the packet, a service type associated with the packet, and a control signal associated with the packet; and
   employing a protocol stack means for managing an interaction between the smart GGSN, the switch, and the mobile edge service to enable management of the packet.

21. The method of claim 20, wherein receiving the packet further comprises receiving the packet from at least one of a wireless application, a Gi interface, and a Gn interface.

22. The method of claim 20, wherein forwarding the packet further comprises employing an edge Application Programming Interface (API).

23. The method of claim 20, wherein forwarding the packet further comprises:
- routing the packet based at least in part on a control signal associated with the packet;
- routing the packet based at least in part on content associated with the packet; and
- enabling a protocol layer for routing the packet.

24. A system for enabling a mobile edge service, comprising:
- a smart GGSN interface means for receiving a packet from at least one of a wireless application, a Wireless Network Includes (WNI), a Gi interface, and a Gn interface;
- a switching means for receiving the packet from the interface means, and for determining where to route the packet, based at least in part on a request associated with the packet;
- a core service means for employing the request associated with the packet and providing the packet to at leas one mobile edge service; and
- a protocol stack means for managing an interaction between the interface means, the switching means, and the core service means.

* * * * *

UNITED STATES PATENT AND TRADEMARK OFFICE
CERTIFICATE OF CORRECTION

PATENT NO. : 6,891,842 B2
DATED : May 10, 2005
INVENTOR(S) : Jarmo Hillo et al.

It is certified that error appears in the above-identified patent and that said Letters Patent is hereby corrected as shown below:

Column 1,
Line 7, delete "60,324,796" and insert -- 60/324,796 --.

Column 14,
Line 13, after "signal" delete ",".

Column 16,
Line 7, delete "leas" and insert -- least --.

Signed and Sealed this

Nineteenth Day of July, 2005

JON W. DUDAS
*Director of the United States Patent and Trademark Office*